United States Patent
Eriksson

[11] Patent Number: 6,129,117
[45] Date of Patent: Oct. 10, 2000

[54] PORTABLE HOLDING TANK

[75] Inventor: Lars E. Eriksson, Battle Creek, Mich.

[73] Assignee: Barker Manufacturing Co., Inc., Battle Creek, Mich.

[21] Appl. No.: 09/336,452

[22] Filed: Jun. 21, 1999

[51] Int. Cl.[7] ........................................ F16K 3/00
[52] U.S. Cl. .................... 137/899; 137/899.3; 4/321; 4/342
[58] Field of Search ............... 4/321, 342; 137/899, 137/899.3

[56] References Cited

U.S. PATENT DOCUMENTS

| | | |
|---|---|---|
| 1,264,679 | 4/1918 | Erikson ................................. 137/899 |
| 2,772,420 | 12/1956 | Carter ..................................... 4/342 |
| 3,327,323 | 6/1967 | Miller, Jr. ............................ 137/899 |
| 3,981,323 | 9/1976 | Watson ................................. 137/899 |
| 4,936,349 | 6/1990 | Cowgur ............................... 137/899 |
| 5,139,278 | 8/1992 | Vlasicak . | |
| 5,346,245 | 9/1994 | Budrow et al. . | |
| 5,988,221 | 11/1999 | Walker ................................. 137/899 |

*Primary Examiner*—A. Michael Chambers
*Attorney, Agent, or Firm*—Young & Basile, P.C.

[57] ABSTRACT

A portable tank for handling recreational vehicle liquid waste comprising a molded receptacle of synthetic plastic material having wheels, including a caster wheel. The receptacle is provided with an inlet port for receiving liquid waste, and an outlet port defined in a side of the receptacle is opened and closed by a gate valve permitting the receptacle to be easily emptied.

6 Claims, 3 Drawing Sheets

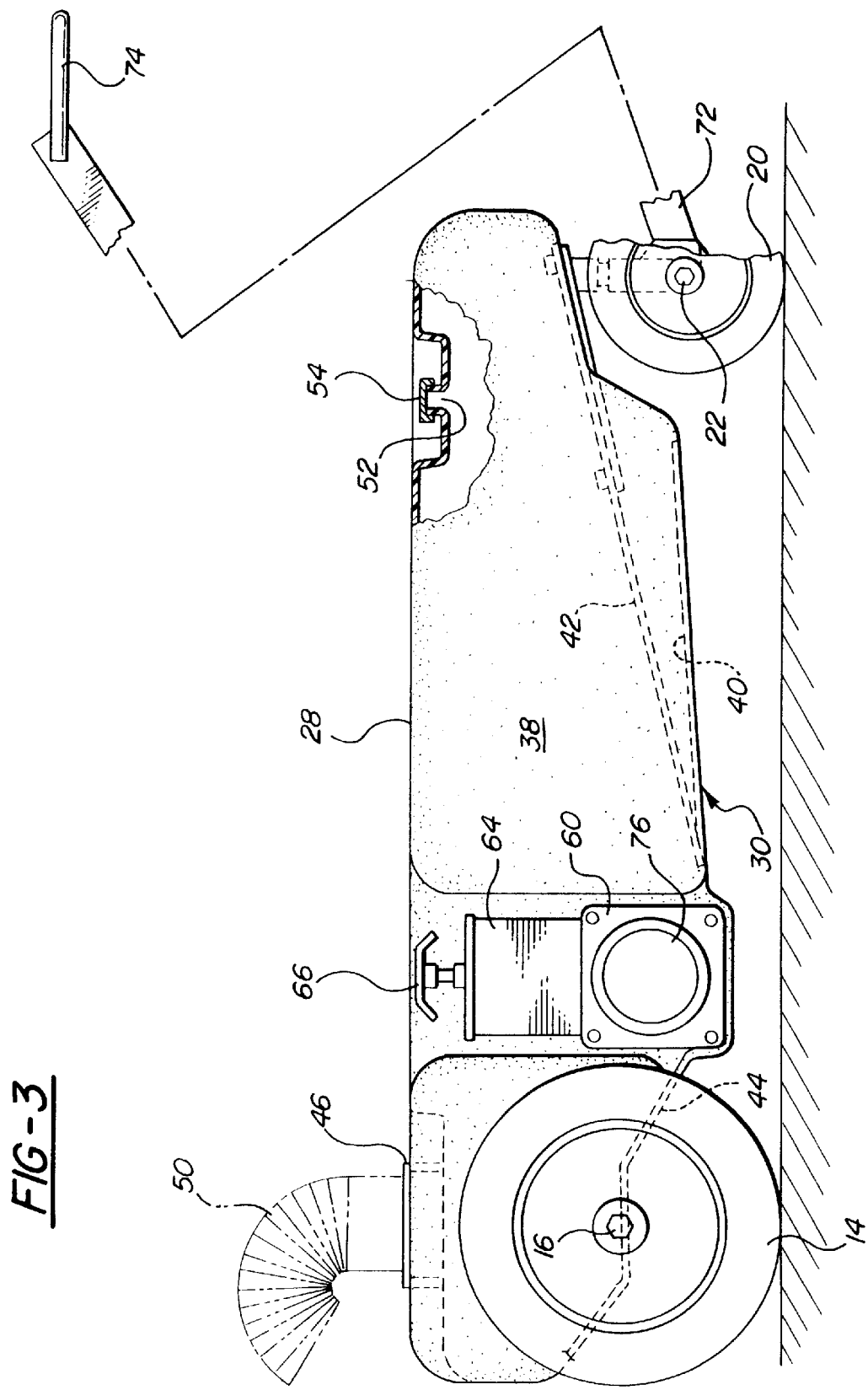

PORTABLE HOLDING TANK

BACKGROUND OF THE INVENTION

1. Field of the Invention

The invention pertains to portable receptacles for liquid waste of relatively large capacity incorporating a large valve to facilitate emptying of the receptacle.

2. Description of the Related Art

Recreational vehicles, such as trailers, motor homes, campers, etc., include liquid waste holding tanks into which the vehicles' sinks, baths and toilets discharge. Such "black water" holding tanks require periodic emptying and sewage receiving stations are usually located at campgrounds to facilitate such operations. However, as the recreational vehicle may be located at a camp site for an extended duration, and as it is often not feasible to move the vehicle, portable waste liquid tanks are used to permit liquid waste to be discharged from the vehicle holding tanks and transported to the dumping station.

Such portable tanks are often molded of a synthetic plastic material and include wheels whereby the tank may be manually pulled to the dumping station, and in instances wherein the portable receptacle is relatively large, i.e. 20 gallons and above, the liquid tank usually includes a handle which may be connected to a motorized vehicle trailer hitch for ease of transport. A portable tank of this type is shown in assignee's U.S. Pat. No. 5,346,245.

Previously, large capacity portable liquid tanks of the above described type have been emptied through the same port that they are filled, requiring that the tank be tipped, and usually inverted, to achieve complete discharge of the tank's contents. With large sizes of portable tanks, this manual manipulation to achieve tank discharge requires considerable force and maneuvering, and may result in the tank being improperly located and not emptied at the exact location desired.

OBJECTS OF THE INVENTION

It is an object of the invention to provide a portable tank for waste liquid which may be of a large capacity, and which may be easily emptied with a minimum of exertion on the part of the operator.

Another object of the invention is to provide a portable tank for waste liquid consisting of a receptacle having a discharge port controlled by a full flow, non-restricting valve wherein only operation of the valve is required to empty the tank.

Yet another object of the invention is to provide a portable liquid waste tank mounted upon wheels wherein one of the wheels is of the caster type to achieve easy steerability, and a handle is mounted upon the caster to facilitate steering and attachment of the tank to a vehicle trailer hitch.

SUMMARY OF THE INVENTION

The portable tank in accord with the invention particularly suitable for handling "black water" received from the sewer system of recreational vehicles is preferably molded of a synthetic plastic material. The tank receptacle includes a top surface in which an inlet port is defined wherein the vehicle waste liquid can be discharged into the receptacle by the usual drain hose.

The molded receptacle is supported upon wheels for ease of transport. Two large wheels are located adjacent the rear of the receptacle disposed adjacent the receptacle lateral sides, while the front end of the receptacle is supported by a double wheel caster unit having a handle pivotally mounted to the caster intermediate the wheels thereof. The handle outer end includes a loop of such dimension as to readily slip over a trailer hitch ball.

On one of the lateral sides of the tank, an outlet port is defined through which the tank may be emptied. Flow through the outlet port is controlled by a manually operated gate valve of a full flow non-restrictive type whereby manual movement of the gate controls fluid flow through the outlet port. An upward movement of the gate opens the port, while a downward movement slides the gate into the port to close the same.

In order to aid in the emptying of the receptacle, the receptacle lower surfaces are inclined to the horizontal toward the outlet port whereby opening of the port permits the entire contents of the tank to drain through the outlet port. For cleansing purposes, a small port is defined in the receptacle upper surface adjacent the tank front end whereby attachment of a garden hose thereto permits clean water to be introduced into the tank to flush the tank and completely remove the contents thereof.

While the tank may be of a relatively large size, 20 gallons or larger, the molded construction of the tank receptacle reduces the empty weight, and the employment of the valved outlet port permits a portable wastewater tank to be provided which may be readily emptied and transported, does not require frequent emptying, and may be readily transported within the recreational vehicle, storage compartment, or pick-up truck bed.

BRIEF DESCRIPTION OF THE DRAWINGS

The aforementioned objects and advantages of the invention will be appreciated from the following description and accompanying drawings wherein:

FIG. 3 is a side elevational view of the portable tank, portions thereof being broken away for purpose of illustration, and dotted lines illustrating the tank surfaces.

DESCRIPTION OF THE PREFERRED EMBODIMENT

Figure 1:
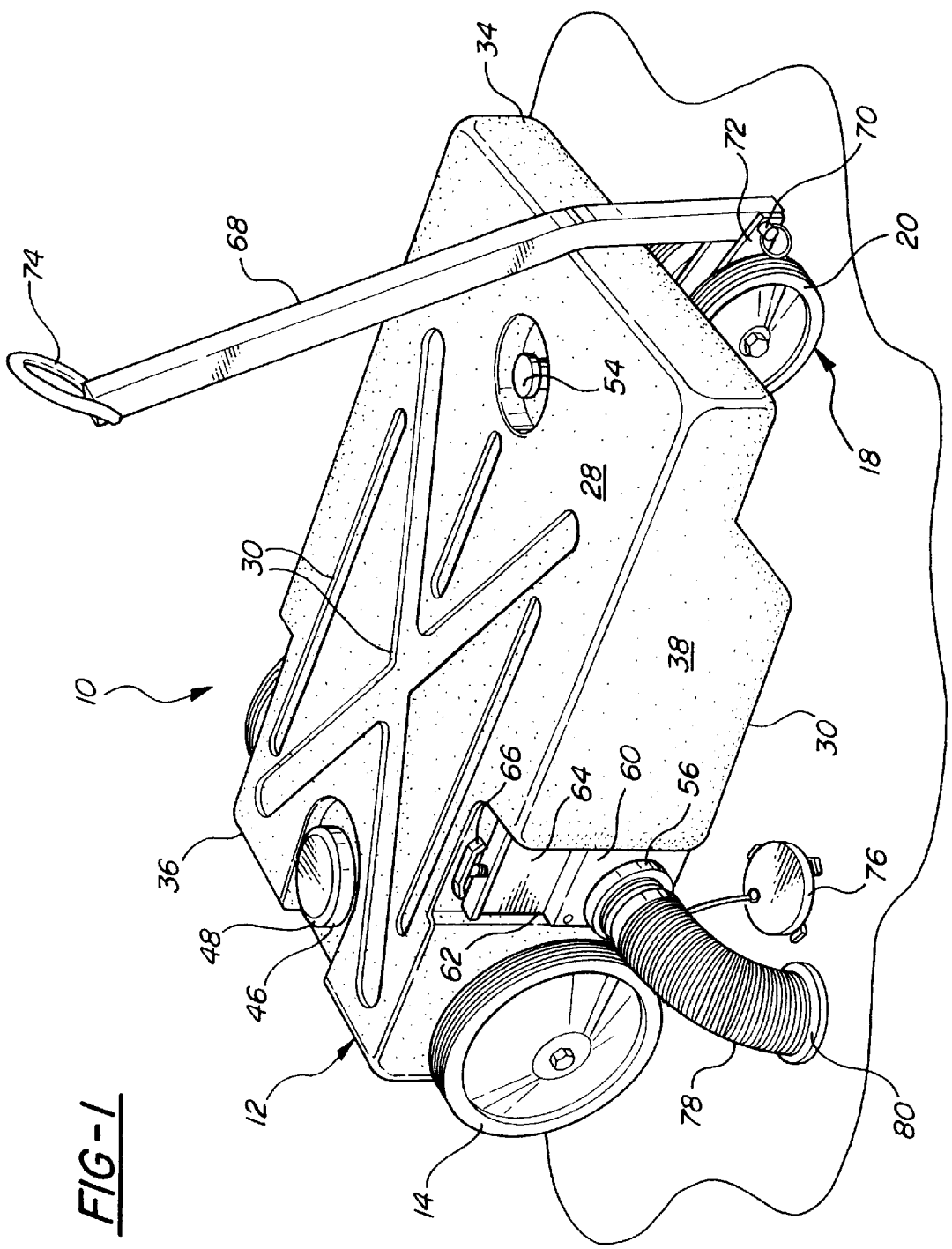
FIG. 1 is a perspective view of a portable tank in accord with the invention illustrating the outlet port being connected to a dumping station by a flexible hose.
Figure 2:
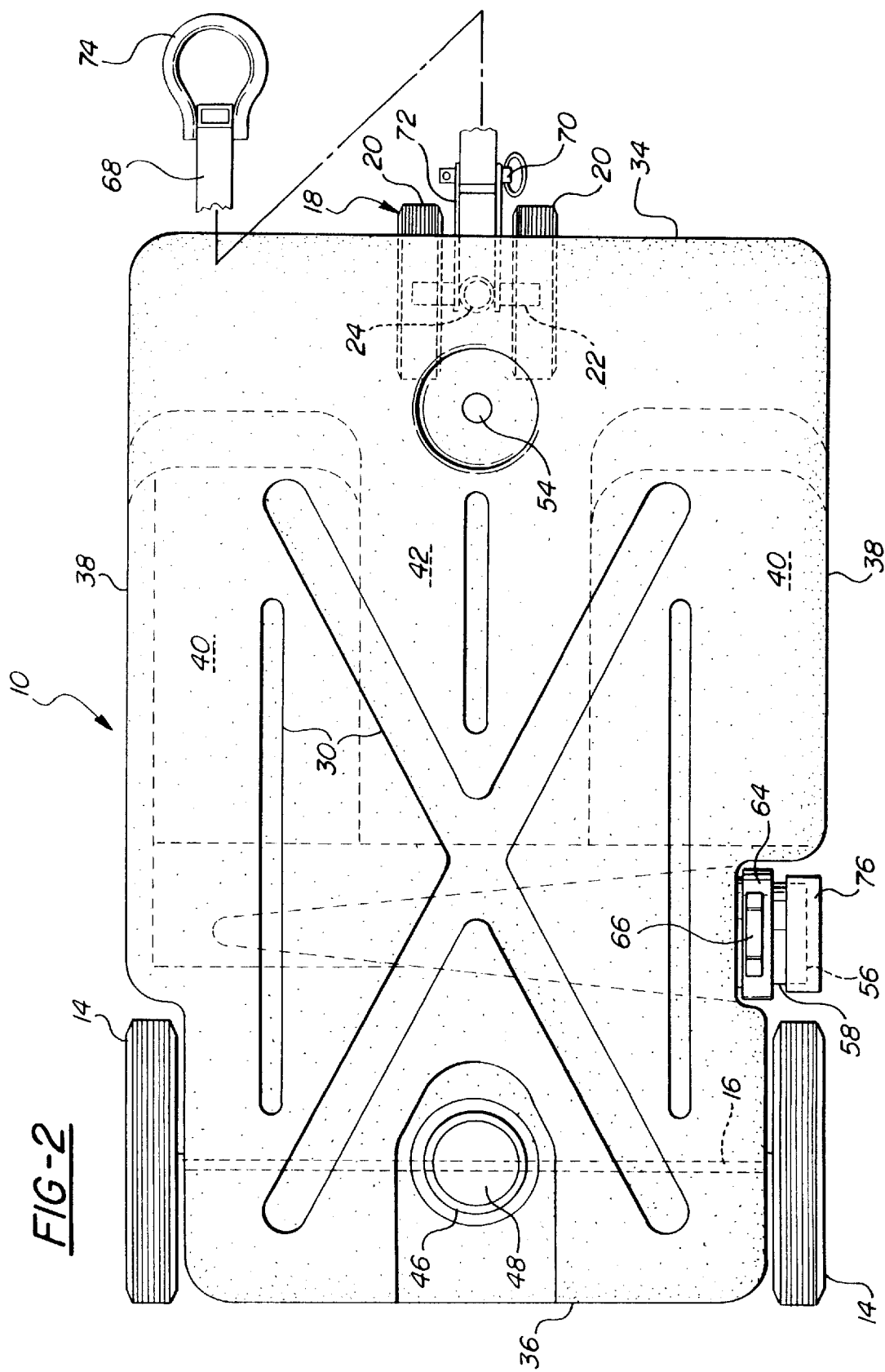
FIG. 2 is an upper plan view of a portable tank in accord with the inventive concept illustrating, in dotted lines, portions of the configuration of the tank lower surfaces.

The overall appearance of the portable tank 10 in accord with the invention will be appreciated from FIG. 1. The primary component of the portable tank 10 is the receptacle 12 which is preferably molded of a synthetic plastic material of high strength. The receptacle 12 is movably supported by rear wheels 14 mounted upon an axle 16, FIG. 2, affixed to the rear of the receptacle, and the forward end of the receptacle 10 is supported upon a caster 18 which includes a pair of spaced wheels 20 mounted upon axle 22. The axle 22 is mounted upon a vertical support 24, FIG. 3, pivotally mounted to the support plate 26 affixed to the underside of the receptacle.

The receptacle 12 includes an upper panel 28 having reinforcement indentations 30 molded therein. The bottom of the receptacle 12 is defined by the lower panel 32, which includes several sections as later described, and the receptacle is defined by a front end 34, a rear 36 and lateral sides 38. The lower panel 32 is defined by inclined sections 40 adjacent the lateral sides 38 obliquely disposed from the front end 34 to a midsection of the panel which defines the lowermost portion of the receptacle 12. The central lower panel section 42 also obliquely extends from the front 34 to the lowermost receptacle portion and is so configured as to provide clearance for the caster 18. The rear lower panel portion 44 obliquely extends from the receptacle rear 36 to the lowermost panel, as will be appreciated from FIG. 3.

An inlet port 46 is defined in the upper panel 28 near the rear 36, and the inlet port 46 may be selectively closed by a cap 48. The port 46 is of sufficient dimension as to receive a wastewater hose 50, FIG. 3, connected to the recreational vehicle waste system and holding tanks, not shown.

A small inlet 52, FIG. 3, is also defined in the receptacle upper panel 28 as located relatively near the receptacle front 34 and may be selectively closed by a cap 54. The purpose of the inlet 52 is to permit a garden hose, or the like, to be attached thereto for flushing the receptacle.

An outlet port 56 is defined in a lateral side 38 of the receptacle 12. The outlet port 56 is located adjacent the lower panel 32 at the midsection of the receptacle at the lowermost portion of the receptacle as defined by the lower panel sections 40–44. The outlet port 56 is sealed by a valve 58 which includes a valve plate 60 for mounting the valve in the outlet port. The valve 58 includes vertical spaced guides 62 in which the gate 64 is slidably mounted for vertical movement between open and closed positions by the handle 66 affixed to the gate.

An elongated handle 68 is affixed to the caster 18 intermediate the wheels 20 at a pivot 70 by a bracket 72 attached to the caster axle 22. In this manner, the handle 68 can be used to rotate the caster 18, steer the movement of the portable tank 10, and pull the tank across the terrain. The outer end of the handle 68 is provided with a loop 74 of such size as to receive the ball of a vehicle mounted trailer hitch whereby the tank 10 may be towed by a vehicle.

The outlet port 56 may include a cap 76, and in use, the portable tank 10 is transported to the wastewater discharge site. The valve cap 76 is removed from the port 56, a hose 78 is placed within the outlet port 56, the valve gate 64 is lifted by means of the handle 66, and the contents of the receptacle 12 are discharged into the septic tank opening 80 through the port 56 and valve 58. To facilitate discharge, the small inlet cap 54 may be removed, and by placing a small hose into the port 56, the receptacle 12 will be flushed so that the contents of the receptacle are removed in their entirety due to the inclined surfaces 40–44. After emptying of the receptacle 12, the hose 78 is removed, the valve cap 76 replaced, the gate 64 lowered into the closed position to close port 56, and the portable tank 10 may be transported to the recreational vehicle for refilling.

It will be appreciated that the inventive concepts permit a relatively low cost means for handling relatively large volumes of wastewater and the location of the outlet port 56 in a lateral side of the receptacle eliminates any necessity to lift or overturn the receptacle during the emptying process providing a more sanitary draining environment and minimizing the effort required to empty the portable tank.

It is appreciated that various modifications to the inventive concepts may be apparent to those skilled in the art without departing from the spirit and scope of the invention.

What is claimed is:

1. A portable tank for waste liquids comprising, in combination, a receptacle molded of a synthetic plastic material having upper and lower portions, a front side, a rear side and lateral sides, an inlet port defined in said upper portion, an outlet port defined in said receptacle in one of said sides adjacent said lower portion, a valve defined in said outlet port movable between open and closed positions controlling liquid flow through said outlet port, said receptacle lower portion comprising surfaces inclined downwardly toward said outlet port, said valve including a gate, guide means defined on said valve adjacent said outlet port, a gate handle defined on said gate for moving said gate between open and closed positions, a wheel mounted on said receptacle adjacent each lateral side and located adjacent said rear side, a steerable wheel mounted on said receptacle adjacent said front side and a tank handle pivotally mounted at said receptacle front side.

2. In a portable tank as in claim 1, said outlet port being defined in one of said lateral sides.

3. In a portable tank as in claim 1, said steerable wheel mounted on said receptacle adjacent said front side comprising a caster, said tank handle having a trailer hitch connectable outer end and being mounted upon said caster.

4. In a portable tank as in claim 3, said caster comprising a pair of axially spaced wheels, said tank handle being mounted on said caster intermediate said wheels.

5. In a portable tank as in claim 2, said receptacle lower portion being defined by first and second surfaces inclined relative to the horizontal, said first surface being inclined downwardly from said receptacle front side to said outlet port and said second surface being inclined downwardly from said receptacle rear side to said outlet port.

6. In a portable tank as in claim 5, a flush port defined in said receptacle upper portion adjacent said front side.

\* \* \* \* \*